Nov. 5, 1968  J. P. VILLO  3,408,887
ADJUSTABLE SHOULDER BOLT FOR USE IN A STRIPPER MEANS
Filed Nov. 18, 1966
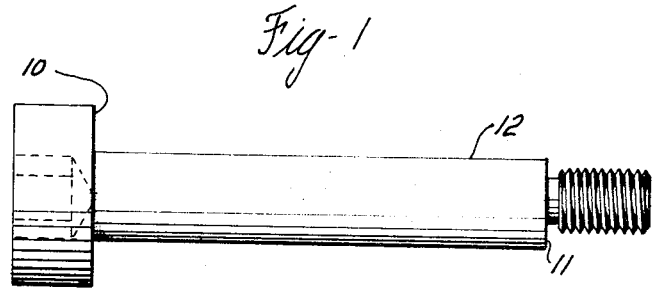
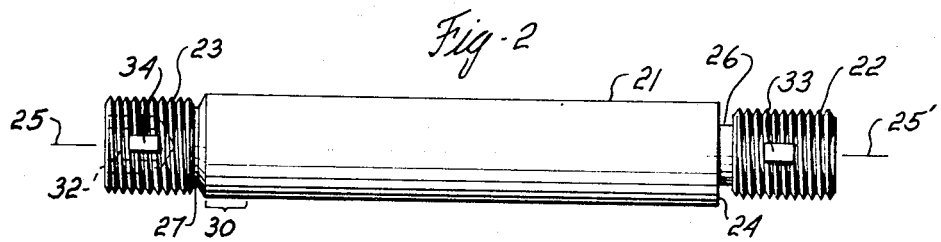
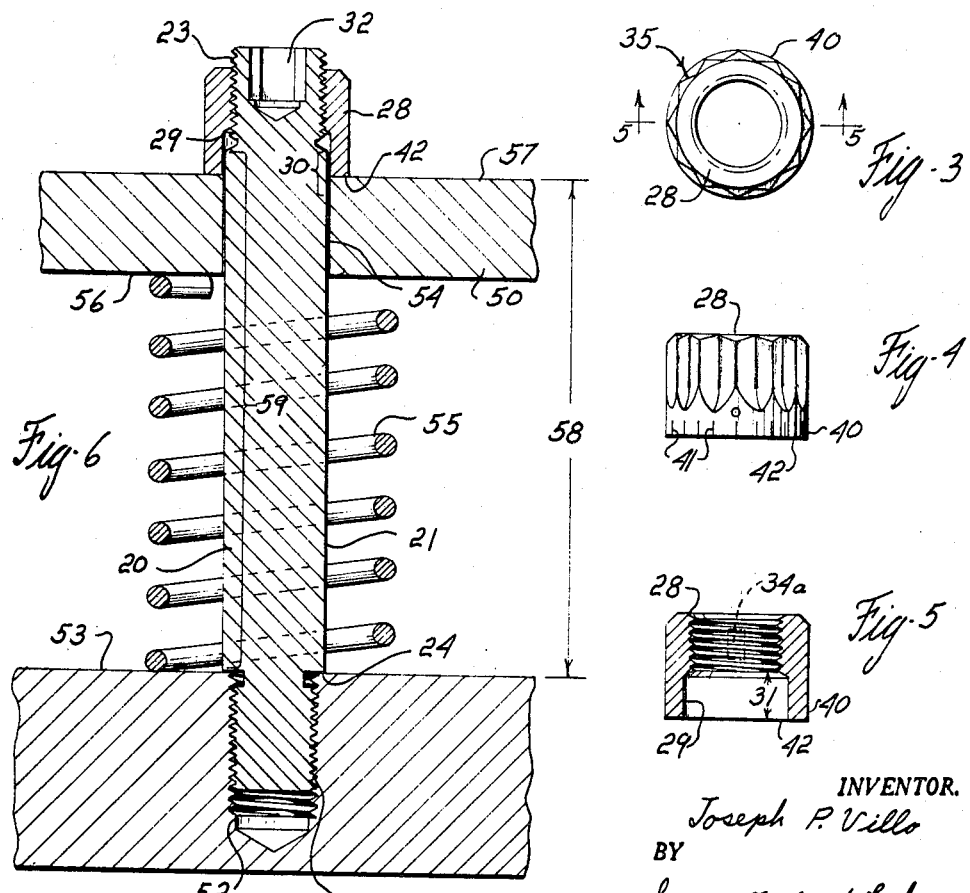
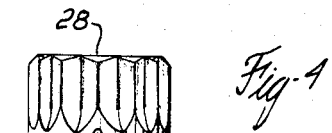
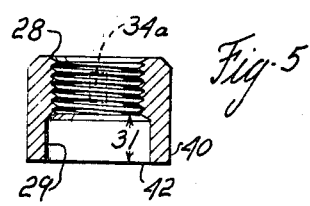
INVENTOR.
Joseph P. Villo
BY
Lynnestvedt & Lechner
ATTORNEYS

United States Patent Office 3,408,887
Patented Nov. 5, 1968

3,408,887
ADJUSTABLE SHOULDER BOLT FOR USE IN A STRIPPER MEANS
Joseph P. Villo, Rydal, Pa., assignor to Standard Pressed Steel Co., Jenkintown, Pa., a corporation of Pennsylvania
Filed Nov. 18, 1966, Ser. No. 595,450
12 Claims. (Cl. 83—140)

This invention relates to an adjustable shoulder bolt that is especially adapted for use in tool and die work. Another aspect of the invention relates to the use of such bolts in stripper spring units.

FIGURE 1 illustrates a conventional shoulder bolt (sometimes also referred to as a stripper bolt). When a conventional shoulder bolt is used in a punch press, spacing adjustments of the punch and stripper are made either by placing shims under the bolt head 10 or under the shoulder 11, or by machining the shoulder 11. Because of the high degree of precision required in tool and die work shimming is not particularly satisfactory. Fine adjustments are a must on intricate dies and they cannot be easily made with shims. Machining the hard tempered body 12 to reduce its length poses difficult positioning alignment problems during the cutting operation. Further such adjustments are exceedingly time consuming to effect. Conventional shoulder bolts have a fixed body length, therefore, still another difficulty arises in that it is necessary to stock a large number of different bolt sizes in order to effectively accommodate the infinite number of punch-stripper positionings needed in actual operations.

Accordingly, it is an object of this invention to provide adjustable shoulder bolt that permits its utilization over a wide range of grip lengths and which will at the same time permit highly precise fine adjustments to be made with ease. In addition, it is a further object of this invention to provide an adjustable shoulder bolt that will hold and maintain adjustments once they have been made.

Still other objects and advantages will appear in the ensuing description.

These objects and advantages are accomplished in accordance with this invention by an adjustable shoulder bolt including a nut member and stud member of circular cross section, said stud being externally threaded at both of its ends and having a body section of uniform diameter intermediate the threaded ends, the outside diameter of the body section being larger than the major diameter of either of the threaded end sections, the body section at one end terminating in a shoulder that lies in a plane perpendicular to the stud axis, the nut being in threaded engagement with the threaded stud end opposite the shoulder end, said nut having a deep counterbore in the face presented toward the shoulder end, said counterbore having a diameter greater than the stud diameter and wherein the threaded stud end projecting through the nut member has a wrench receiving surface for the application of torquing forces to the stud.

In the drawings:

FIGURE 1 is a plan view of a conventional shoulder bolt.

FIGURE 2 is a plan view of the stud element of the adjustable shoulder bolt of this invention.

FIGURE 3 is a top view of the nut element of an adjustable shoulder bolt made in accordance with this invention.

FIGURE 4 is a plan view in a plane perpendicular to the nut axis of the nut element of an adjustable shoulder bolt made in accordance with this invention.

FIGURE 5 is a section view of the nut element in FIGURES 3 and 4 on line 5–5.

FIGURE 6 is a simplified illustration of the use of my shoulder bolt in a stripper spring unit of a press.

The body section 21 of the stud element of my adjustable shoulder bolt is of uniform circular cross section along its full length, and in the simplest embodiment, the body diameter is the widest portion of the entire element. The ends of the studs are of reduced diameter and are provided with external threads 22, 23. At one end the body section terminates in an abrupt shoulder 24 that lies in a plane perpendicular to the stud axis 25–25' which is, of course, concentric with the axis of threads 22, 23. The threaded shoulder end has an appreciably smaller outside diameter than the adjacent body section so as to permit good seating contact at the shoulder, further in this connection, it is desirable to neck down 26 the stud at the shoulder to eliminate the run-out threads and provide a larger and cleaner seating face at the shoulder and provide full depth threads along the entire length of threading.

At the head end of the stud (i.e., the threaded end portion 23 opposite the shoulder 24 end of the stud) the threaded end 23 is adapted to engage the threads of a nut element 28. In the preferred arrangement, the inmost threads run out cleanly as full depth threads at an undercut 27 immediate adjacent the stud body section. A counterbore 29 is formed in the nut element, this counterbore has a slightly larger bore diameter than the outside diameter of the stud body 21 and when the nut is threaded on the head end as shown in FIGURE 6, the upper stud body section portions 30 can be received within the counterbore preferably with a sliding fit. The depth 31 of the counterbore will determine the extent to which adjustments can be made in grip length of the shoulder bolt. The nut element 28 can desirably be provided with a wrench receiving surface (such as the 12-point drive 35 illustrated in FIGURE 3) for the application of torquing forces to the nut.

The head end of the stud that projects through the nut element is also provided with a wrench receiving surface for applying torque forces to the stud to enable driving the shoulder end threads and seating the shoulder against the workpiece. In the illustrated embodiment the wrenching surface is a broached hex socket 32.

In order to provide self-locking features to the threads at both ends of the studs plastic locking elements can be provided at various points e.g., plastic lock 33 on the shoulder end threads, plastic lock 34 on the head end stud threads, or if desired, a plastic locking element can be applied to the nut threads 34a. In the latter case, it is possible to eliminate lock 34, but the lock can in some instances be beneficially applied to both threaded members. Such locks can be fused plastic elements applied as described in my Patent 3,093,177 or they can be applied in the form of plastic plugs that are inserted in a slot or hold formed in the body of the threaded area.

In order to prevent backing out of the shoulder end threads when the nut is turned, the shoulder end threads should be more resistant to torquing forces than the nut end threads. This can be accomplished in various ways. For example, the locking action of the shoulder thread locking elements and the nut end locking element can be varied by controlling the mass of the plastic in the V of the threads. In addition, holding power of the shoulder end and head end threads can be readily designed to have different thread surface contact areas and frictional differences so that head end threads will turn more readily than the shoulder end threads. Thus, if the threads 22 and 23 have the same profile and pitch, the head end threads should have a smaller major diameter than the shoulder end threads so as to make the shoulder end threads more resistant to torquing. Alternatively, where the threads have the same profile and pitch diameter torquing differentials of the type desired can be built in by increasing the pitch of the nut end threads relative to the pitch of the shoulder end threads.

In order to facilitate making fine adjustments of the grip length, it is desirable to employ a nut in which the end 40 is circular in cross section and is provided with a plurality of axially extending scribe markings 41 on the nut wall and for accurate measurements these marks should be equiangularly spaced. Thus, if conventional micrometer threading (40 threads/inch) were used at the nut end and if 25 equally spaced scribe lines were positioned about the full circumference of the nut, rotating the nut 1 space would represent axial movement of 0.001″ of the nut face 42.

It should be noted that the plane of the nut face 42 that is nearest the shoulder end should be parallel to the plane of the shoulder face 24 in order to insure precise control of movement and positioning.

The use, in stripper spring unit of a press is illustrated in FIGURE 6. The punch press has a top shoe 50 by which the punching means (not shown) are carried in a conventional manner, and a stripper plate 51. The shoulder bolt 20 is securely seated in the hole 52 in the upper face 53 of the stripper plate with shoulder 24 in contact with face 53. The stud body 21 passes through a guide hole 54 in the top shoe; usually the bore hole is dimensioned for a sliding fit on the stud body. A helical compression spring 55 surrounds the stud body and is positioned between the upper face 53 of the stripper plate and the lower face 56 of the top shoe. The nut face 42 bears against a flat surface on the upper face 57 of the top shoe and maintains the compression of the spring member even when the stripper plate and top shoe are in their retracted positions as illustrated.

It should be observed that the design of my shoulder bolt is such that in use the shoulder bolt can be set merely by adjusting nut 28 for different grip lengths 58 that are less than the length of the stud body section 59 and so that the upper end portion 30 of the stud body section can always be positioned within the nut counterbore 29. Further, the plastic locking elements at the shoulder end and head end threads serve to hold the settings of the elements even when they are subjected to the vibration and stresses incident to operation of the stripper spring unit. This type of arrangement prevents lateral play of the top shoe from damaging the head end threads when the stripper plates are returned to battery by the compression spring upon retraction of the punch and it also serves to insure correct punch alignment by eliminating play at guide hole 54 for any position of the top shoe along the stud body in the punching cycle.

I claim:
1. An adjustable shoulder bolt including a nut member and stud member of circular cross section, said stud being externally threaded at both of its ends and having a body section of uniform diameter intermediate the threaded ends, the outside diameter of the body section being larger than the major diameter of either of the threaded end sections, the body section at one end terminating in a shoulder that lies in a plane perpendicular to the stud axis, the nut being in threaded engagement with the threaded stud end opposite the shoulder end, said nut having a deep counterbore in the face presented toward the shoulder end, said counterbore having a diameter greater than the stud diameter and wherein the threaded stud end projecting through the nut member has a wrench receiving surface for the application of torquing forces to the stud.

2. A shoulder bolt according to claim 1 wherein a plastic locking element is applied to the stud threads at the shoulder end.

3. A shoulder bolt according to claim 1 wherein a plastic locking element is applied to the stud threads of the nut end.

4. A shoulder bolt according to claim 1 wherein a plastic locking element is applied to the nut threads.

5. A shoulder bolt according to claim 1 wherein the shoulder end threads are more resistant to torquing forces than the nut end threads.

6. A shoulder bolt according to claim 1 wherein the nut is provided with wrench receiving surfaces for the application of torquing forces to the nut.

7. A shoulder bolt according to claim 1 wherein the nut face presented toward the shoulder end is parallel to the shoulder face.

8. A shoulder bolt according to claim 1 wherein the end of the nut presented toward the shoulder end is of circular cross section and is provided with a plurality axially extending and equal angularly spaced linear scribe markings.

9. A shoulder bolt according to claim 1 wherein the major diameter of the nut end stud threads is greater than the major diameter of the shoulder end stud threads.

10. A shoulder bolt according to claim 8 wherein there are 25 evenly spaced scribe lines around the full nut circumference and the nut end threads have a pitch of 40 threads per inch.

11. A shoulder bolt according to claim 1 wherein the pitch of the shoulder end threads is less than the pitch of the nut end threads.

12. In combination with a punch press having a top shoe carrying punching means, a stripper plate and an adjustable shoulder bolt including a nut member and stud member of circular cross section, said stud being externally threaded at both of its ends and having a body section of uniform diameter intermediate the threaded ends, the outside diameter of the body section being larger than the major diameter of either of the threaded end sections, the body section at one end terminating in a shoulder that lies in a plane perpendicular to the stud axis, the nut being in threaded engagement with the threaded stud end opposite the shoulder end, said nut having a deep counterbore in the face presented toward the shoulder end, said counterbore having a diameter greater than the stud diameter and wherein the threaded stud end projecting through the nut member has a wrench receiving surface for the application of torquing forces to the stud, the shoulder end of the bolt being seated in the upper face of the stripper plate, the stud body passing through a guide hole in the top shoe, a helical compression spring surrounding the stud body and positioned between the lower shoe face and the upper face of the stripper plate and wherein the end of the stripper bolt nut that is presented toward the shoulder end bears against a flat surface on the upper face of the top shoe.

References Cited
UNITED STATES PATENTS

| | | | |
|---|---|---|---|
| 1,811,987 | 6/1931 | Wales | 83—140 X |
| 2,084,146 | 6/1937 | Key | 85—1 |
| 2,539,887 | 1/1951 | Boots | 151—7 |
| 2,588,372 | 3/1952 | Erb | 85—32 |
| 3,216,540 | 11/1965 | Blinn | 85—1 X |

ANDREW R. JUHASZ, *Primary Examiner.*